(12) United States Patent
Ramanathan et al.

(10) Patent No.: US 12,480,537 B2
(45) Date of Patent: Nov. 25, 2025

(54) ACTUATOR FOR MACHINE

(71) Applicant: Caterpillar Inc., Peoria, IL (US)

(72) Inventors: Sivakumar Ramanathan, Chennai (IN); Rameshkrishnan Lakshminarayanan, Chennai (IN); Kurt Steven Goslovich, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 736 days.

(21) Appl. No.: 17/658,093

(22) Filed: Apr. 6, 2022

(65) Prior Publication Data

US 2023/0323902 A1 Oct. 12, 2023

(51) Int. Cl.
*B60P 1/00* (2006.01)
*F15B 15/20* (2006.01)

(52) U.S. Cl.
CPC .............. *F15B 15/20* (2013.01); *B60P 1/006* (2013.01)

(58) Field of Classification Search
CPC ................................ F15B 15/20; B60P 1/006
See application file for complete search history.

(56) References Cited

U.S. PATENT DOCUMENTS

| | | |
|---|---|---|
| 2,308,761 A | 1/1943 | Komph, Sr. |
| 2,364,741 A | 12/1944 | Merchant |
| 3,483,798 A | 12/1969 | Parrett et al. |
| 4,339,989 A | 7/1982 | Webster |
| 6,116,140 A * | 9/2000 | Barthalow ............... F15B 15/16 91/530 |
| 6,257,117 B1 * | 7/2001 | Yagishita ............ F15B 15/1409 91/169 |
| 6,450,083 B1 * | 9/2002 | Dawson .................. F15B 15/16 92/53 |
| 6,851,349 B2 * | 2/2005 | Dohallow ............... F15B 15/16 91/169 |

(Continued)

FOREIGN PATENT DOCUMENTS

| | | |
|---|---|---|
| CN | 204200759 | 3/2015 |
| CN | 105298981 | 2/2016 |

(Continued)

OTHER PUBLICATIONS

Written Opinion and International Search Report for Int'l. Patent Appln. No. PCT/US2023/015452, mailed Jun. 1, 2023 (13 pgs).

*Primary Examiner* — Saul Rodriguez
*Assistant Examiner* — Ashley K Romano

(57) ABSTRACT

An actuator for a machine includes a cylinder barrel and a piston arrangement received within the cylinder barrel. The actuator further includes a first cylinder received within the cylinder barrel and a first member coupled to the first cylinder at a first cylinder end of the first cylinder. The actuator also includes a second cylinder received within the first cylinder and a second member coupled to the second cylinder at a second cylinder end of the second cylinder. The actuator includes a third cylinder received within the first cylinder and a third member coupled to the third cylinder at a third cylinder end of the third cylinder. At least one of the first member, the second member, and the third member is threadedly coupled to the first cylinder, the second cylinder, and the third cylinder, respectively.

20 Claims, 5 Drawing Sheets

(56) References Cited

U.S. PATENT DOCUMENTS

| | | | |
|---|---|---|---|
| 7,337,885 B2* | 3/2008 | Stow | F16F 9/49 |
| | | | 188/289 |
| 9,278,836 B2* | 3/2016 | Hisel | F15B 15/1433 |
| 10,737,545 B1* | 8/2020 | Dillenbeck | B60G 17/08 |
| 10,746,251 B2* | 8/2020 | Ruan | F16F 15/022 |
| 11,067,142 B2* | 7/2021 | Tseng | F16D 65/0043 |

FOREIGN PATENT DOCUMENTS

| | | |
|---|---|---|
| CN | 105443493 | 3/2016 |
| CN | 106837925 A | 6/2017 |
| CN | 109058226 | 12/2018 |
| CN | 110410381 | 2/2021 |
| CN | 112762053 A | 5/2021 |
| FR | 2259296 | 8/1975 |
| JP | 3571257 | 9/2004 |

\* cited by examiner

ACTUATOR FOR MACHINE

TECHNICAL FIELD

The present disclosure relates to an actuator for a machine, and more particularly, to an actuator associated with a material handling system of the machine.

BACKGROUND

A machine, such as a dump truck, may be used to move material, such as dirt and rock, from one point to another. Conventionally, the machine may dump material by moving a receptacle of the machine relative to the frame of the machine. Specifically, the receptacle may pivot relative to the frame, thereby causing the material to fall out of the receptacle. However, due to height constraints, such as in underground applications, it may be challenging to pivot the entire receptacle for dumping the material. Therefore, in such applications, an ejector plate may be associated with the receptacle to dump the material. Further, an actuator may move the ejector plate with respect to the receptacle for ejecting the material out of the receptacle at a controlled rate.

Generally, the actuator includes a multistage actuator. The multistage actuator may include one or more nested telescoping cylinders of successively smaller diameters. The multistage actuator may also include a retention mechanism to hold the one or more nested telescoping cylinders during a retraction of the multistage actuator for preventing free movement of the telescoping cylinders. The retention mechanism may include a number of retainer rings or welded piston stops. Further, forces, such as axial forces, may act on the multistage actuator during an extension and the retraction of the multistage actuator. Such forces may cause the retainer rings or the welded piston stops to fail. Specifically, conventional retainer rings and/or welded piston stops may not be able to withstand the forces that are experienced during the operation of the multistage actuator.

Further, the retainer rings and the welded piston stops may not be easy to assemble in a factory set-up or easy to replace during field service, as special tools and set-ups may be required to assemble/replace them. Moreover, a replacement process of the retainer rings and the welded piston stops may be time consuming, which may in turn increase a down time of the machine.

CN110410381B describes a multi-stage composite telescopic hydraulic cylinder for heavy loads and relates to the technical field of fluid transmission. Through the matching design between multi-stage cylinders, the telescopic speed of the heavy-load multi-stage hydraulic cylinders can be obviously improved, the grade-changing impact frequency is reduced, and the problems that an existing composite telescopic hydraulic cylinder is difficult to process and manufacture, cannot be assembled and cannot be filled with oil in advance are solved; and in addition, the synchronous error generated in the reciprocating motion of the hydraulic cylinder can be eliminated, machining and manufacturing are simple, and installation and maintenance are easy.

SUMMARY OF THE DISCLOSURE

In an aspect of the present disclosure, an actuator for a machine is provided. The actuator includes a cylinder barrel defining a cylinder end of the actuator. The actuator also includes a piston arrangement concentrically received within the cylinder barrel. The piston arrangement defines a piston end of the actuator. The actuator further includes a first cylinder concentrically received within the cylinder barrel. The first cylinder defines a first cylinder end that is disposed proximal to the cylinder end of the actuator when the actuator is in a retracted position. The first cylinder further defines a first piston end that is disposed proximal to the piston end of the actuator when the actuator is in the retracted position. The actuator includes a first member coupled to the first cylinder at the first cylinder end. The actuator also includes a second cylinder concentrically received within the first cylinder. The second cylinder defines a second cylinder end that is disposed proximal to the first cylinder end when the actuator is in the retracted position. The second cylinder further defines a second piston end that is disposed proximal to the piston end of the actuator when the actuator is in the retracted position. The actuator further includes a second member coupled to the second cylinder at the second cylinder end. The actuator includes a third cylinder concentrically received within the second cylinder. The third cylinder receives the piston arrangement therein. The third cylinder defines a third cylinder end that is disposed proximal to the second cylinder end when the actuator is in the retracted position. The third cylinder further defines a third piston end that is disposed proximal to the piston end of the actuator when the actuator is in the retracted position. The actuator also includes a third member coupled to the third cylinder at the third cylinder end. At least one of the first member, the second member, and the third member is threadedly coupled to the first cylinder, the second cylinder, and the third cylinder, respectively.

In another aspect of the present disclosure, a material handling system for a machine is provided. The material handling system includes a receptacle having a material ejection system. The material handling system also includes an actuator operatively coupled to the receptacle and the material ejection system. The actuator includes a cylinder barrel defining a cylinder end of the actuator. The actuator is coupled to the material ejection system at the cylinder end thereof. The actuator also includes a piston arrangement concentrically received within the cylinder barrel. The piston arrangement defines a piston end of the actuator. The actuator is coupled to the receptacle at the piston end thereof. The actuator further includes a first cylinder concentrically received within the cylinder barrel. The first cylinder defines a first cylinder end that is disposed proximal to the cylinder end of the actuator when the actuator is in a retracted position. The first cylinder further defines a first piston end that is disposed proximal to the piston end of the actuator when the actuator is in the retracted position. The actuator includes a first member coupled to the first cylinder at the first cylinder end. The actuator also includes a second cylinder concentrically received within the first cylinder. The second cylinder defines a second cylinder end that is disposed proximal to the first cylinder end when the actuator is in the retracted position. The second cylinder further defines a second piston end that is disposed proximal to the piston end of the actuator when the actuator is in the retracted position. The actuator further includes a second member coupled to the second cylinder at the second cylinder end. The actuator includes a third cylinder concentrically received within the second cylinder. The third cylinder receives the piston arrangement therein. The third cylinder defines a third cylinder end that is disposed proximal to the second cylinder end when the actuator is in the retracted position. The third cylinder further defines a third piston end that is disposed proximal to the piston end of the actuator when the actuator is in the retracted position. The actuator also includes a third member coupled to the third cylinder at the third cylinder end. At least one of the first member, the second member, and the third member is threadedly coupled to the first cylinder, the second cylinder, and the third cylinder, respectively.

In yet another aspect of the present disclosure, a machine is provided. The machine includes a frame. The machine also includes a material handling system supported by the frame. The material handling system includes a receptacle having a material ejection system. The material handling system also includes an actuator operatively coupled to the receptacle and the material ejection system. The actuator includes a cylinder barrel defining a cylinder end of the actuator. The actuator is coupled to the material ejection system at the cylinder end thereof. The actuator also includes a piston arrangement concentrically received within the cylinder barrel. The piston arrangement defines a piston end of the actuator. The actuator is coupled to the receptacle at the piston end thereof. The actuator further includes a first cylinder concentrically received within the cylinder barrel. The first cylinder defines a first cylinder end that is disposed proximal to the cylinder end of the actuator when the actuator is in a retracted position. The first cylinder further defines a first piston end that is disposed proximal to the piston end of the actuator when the actuator is in the retracted position. The actuator includes a first member coupled to the first cylinder at the first cylinder end. The actuator also includes a second cylinder concentrically received within the first cylinder. The second cylinder defines a second cylinder end that is disposed proximal to the first cylinder end when the actuator is in the retracted position. The second cylinder further defines a second piston end that is disposed proximal to the piston end of the actuator when the actuator is in the retracted position. The actuator further includes a second member coupled to the second cylinder at the second cylinder end. The actuator includes a third cylinder concentrically received within the second cylinder. The third cylinder receives the piston arrangement therein. The third cylinder defines a third cylinder end that is disposed proximal to the second cylinder end when the actuator is in the retracted position. The third cylinder further defines a third piston end that is disposed proximal to the piston end of the actuator when the actuator is in the retracted position. The actuator also includes a third member coupled to the third cylinder at the third cylinder end. At least one of the first member, the second member, and the third member is threadedly coupled to the first cylinder, the second cylinder, and the third cylinder, respectively.

Other features and aspects of this disclosure will be apparent from the following description and the accompanying drawings.

DETAILED DESCRIPTION

Figure 1:
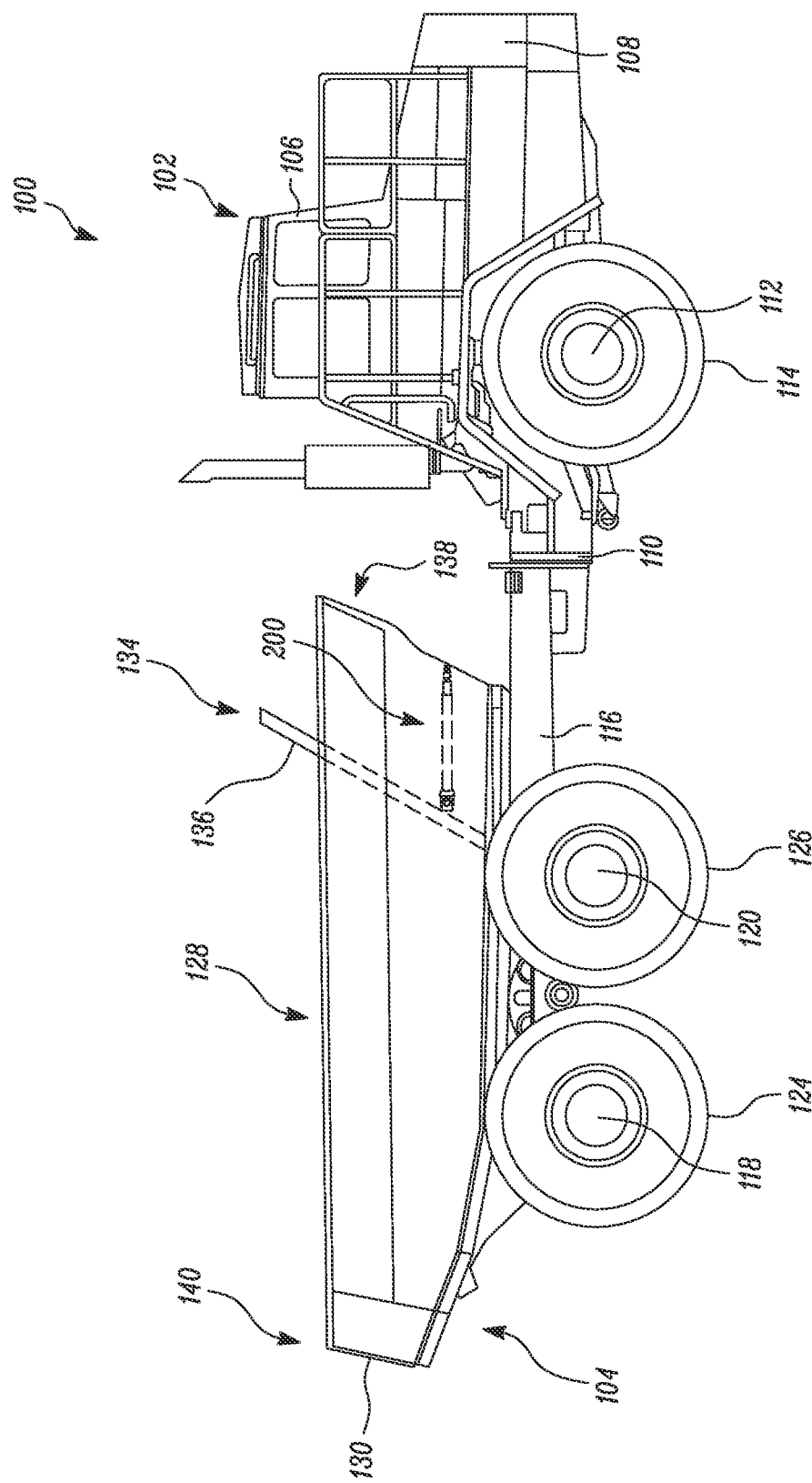
FIG. 1 is a schematic side view of a machine, according to an embodiment of the present disclosure.

Wherever possible, the same reference numbers will be used throughout the drawings to refer to the same or like parts. Referring to FIG. 1, a schematic view of an exemplary machine 100 is illustrated. The machine 100 may be used to move materials, such as dirt and rock, from one place to another, without any limitations. The machine 100 is embodied as an articulated dump truck. In some examples, the machine 100 may be used at underground worksites, without any limitations. Although the articulated dump truck is depicted, the present disclosure is not limited to a type of the machine 100. It may be understood that the machine 100 may alternatively include any other type of truck, that may be used for movement of materials, or another construction or mining machine, without any limitations.

The machine 100 includes a cab assembly 102 and a trailer assembly 104. The cab assembly 102 includes an operator cabin 106, an enclosure 108, etc. An operator of the machine 100 may sit or stand in the operator cabin 106 for operating the machine 100. The operator cabin 106 may include a user interface (not shown). Further, a power source (not shown) may be disposed in the enclosure 108. The power source may be an engine, such as an internal combustion engine, any electric source of power, and the like. The engine may include a gasoline engine, a diesel engine, a natural gas engine, and the like. The engine may supply output power to various components of the machine 100 for operation thereof. Further, the cab assembly 102 is pivotably coupled to the trailer assembly 104 by a hitch and collar assembly 110 which allows the cab assembly 102 to rotate and twist in relation to the trailer assembly 104. The cab assembly 102 includes a front axle 112 coupled to a pair of front wheels 114.

The machine 100 further includes a frame 116. The frame 116 may support various components of the trailer assembly 104 thereon. The machine 100 includes a first rear axle 118 and a second rear axle 120 supported by the frame 116. The first rear axle 118 is coupled to a pair of rear wheels 124 and the second rear axle 120 is coupled to a pair of rear wheels 126. The machine 100 also includes a material handling system 128 supported by the frame 116. The material handling system 128 includes a receptacle 130. In an example, the receptacle 130 may receive and carry materials, such as, dirt, rock, dirt, gravels, and the like, without any limitations. In some examples, the receptacle 130 may be pivotable with respect to the frame 116.

Further, the receptacle 130 has a material ejection system 134. The material ejection system 134 may be used at worksites that present height constraints, such as in underground applications. The material ejection system 134 includes an ejector plate 136. A portion of the ejector plate 136 is illustrated in FIG. 1. The ejector plate 136 may be movable between a first end 138 and a second end 140 of the receptacle 130. The ejector plate 136 may eject the material out of the receptacle 130 as the ejector plate 136 moves towards the second end 140.

Further, the material handling system 128 also includes an actuator 200 operatively coupled to the receptacle 130 and the material ejection system 134. In the illustrated example of FIG. 2, the actuator 200 is a hydraulic actuator. Alternatively, the actuator 200 may include a pneumatic actuator. The actuator 200 defines a longitudinal axis A1.

Figure 2:
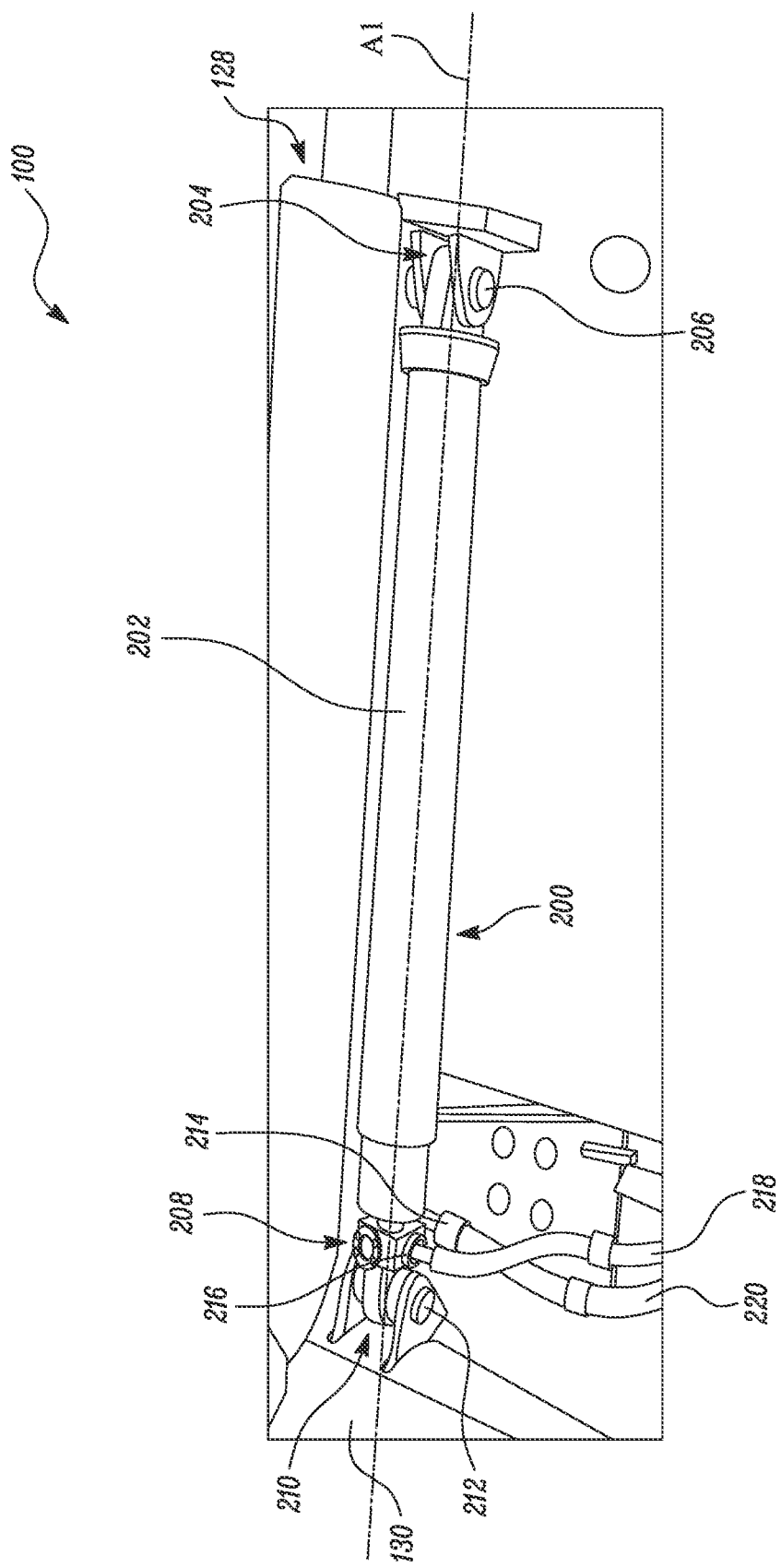
FIG. 2 is a perspective view of an actuator associated with a material handling system of the machine of FIG. 1, according to an embodiment of the present disclosure.

Referring to FIG. 2, the actuator 200 includes a cylinder barrel 202 defining a cylinder end 204 of the actuator 200. Further, an end face 203 of the cylinder barrel 202 is defined proximal to the cylinder end 204. The actuator 200 is coupled to the material ejection system 134 at the cylinder end 204 thereof. In some examples, the actuator 200 may be coupled to the material ejection system 134 by a first mechanical fastener 206. The first mechanical fastener 206 may include bolts, screws, pins, dowels, and the like. In an example, each of the ejector plate 136 (see FIG. 1) and the actuator 200 may include suitable mounting arrangements, such as one or more brackets and a through-opening that may receive the first mechanical fastener 206, for coupling the actuator 200 with the ejector plate 136. Further, the cylinder barrel 202 defines an internal diameter D1 (shown in FIG. 4).

The actuator 200 also includes a piston arrangement 208 concentrically received within the cylinder barrel 202. In an examples, the cylinder barrel 202 may be slidable relative to the piston arrangement 208. The piston arrangement 208 defines a piston end 210 of the actuator 200. The actuator 200 is coupled to the receptacle 130 at the piston end 210 thereof. The cylinder end 204 and the piston end 210 are disposed opposite to each other along the longitudinal axis A1. In some examples, the actuator 200 may be coupled to a wall of the receptacle 130 by a second mechanical fastener 212. The second mechanical fastener 212 may include bolts, screws, pins, dowels, and the like. In an example, each of the receptacle 130 and the actuator 200 may include suitable mounting arrangements, such as one or more brackets and a through-opening that may receive the second mechanical fastener 212 for coupling the actuator 200 with the receptacle 130.

Further, the actuator 200 includes a first fluid port 214 and a second fluid port 216 disposed proximal to the piston end 210 of the actuator 200. The first fluid port 214 and the second fluid port 216 may couple with a first fluid pipe 218 and a second fluid pipe 220, respectively. The first fluid pipe 218 and the first fluid port 214 may allow a first fluid to enter and exit the actuator 200. Further, the second fluid pipe 220 and the second fluid port 216 may allow a second fluid to enter and exit the actuator 200. The first fluid and the second fluid may facilitate movement of the actuator 200 between an extended position and a retracted position, respectively. The actuator 200 is illustrated in the retracted position in the accompanying figure. The actuator 200 is illustrated in the extended position in FIG. 5. In some examples, the first and second fluids may include hydraulic oil. Further, in some examples, the first and second fluids may be the same or the first and second fluids may be different from each other.

Figure 3:
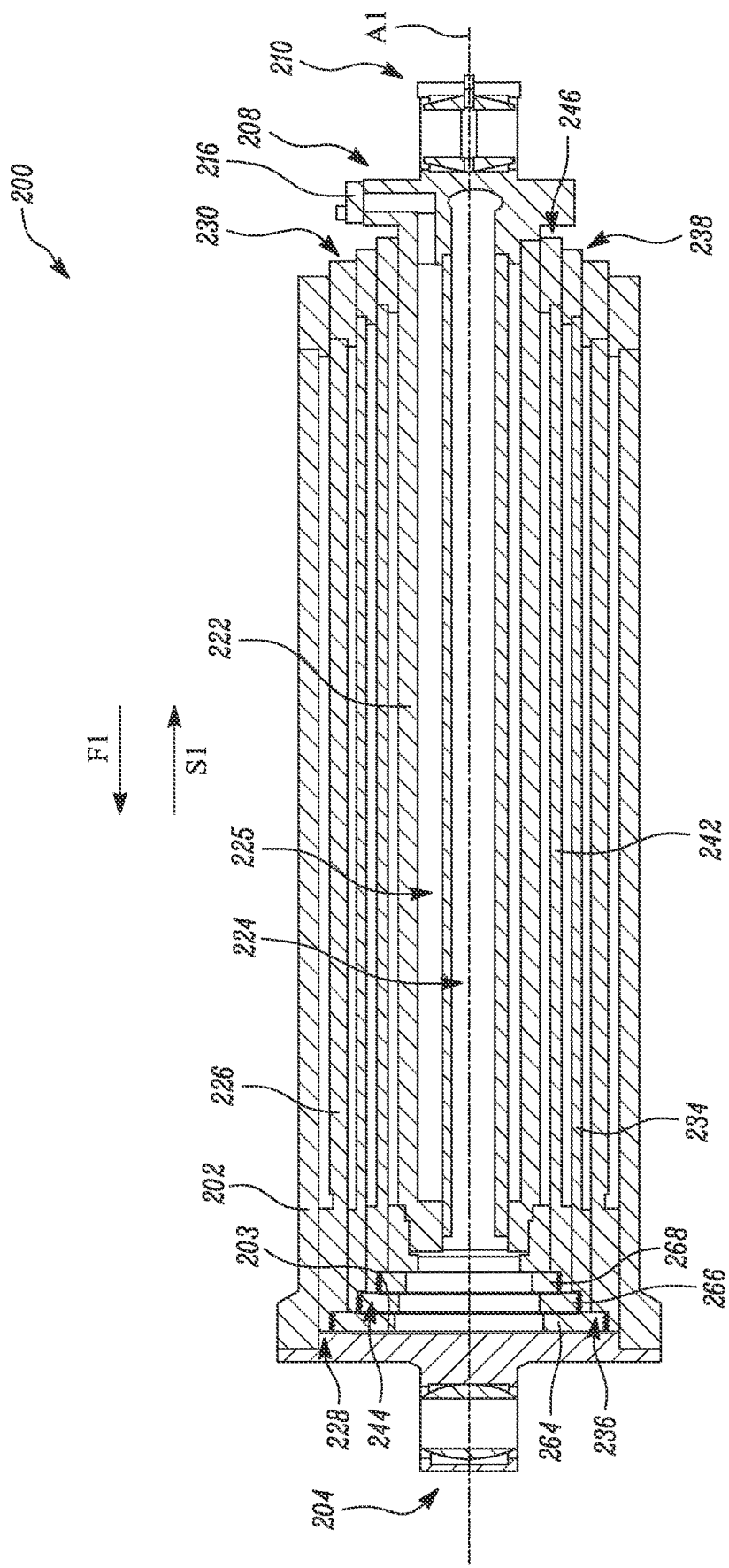
FIG. 3 is a cross-sectional view of the actuator of FIG. 2, in a retracted position.

Referring now to FIG. 3, a cross-sectional view of the actuator 200 is illustrated. The piston arrangement 208 of the actuator 200 includes a tube 222. The tube 222 defines an internal diameter D2 (shown in FIG. 4). The tube 222 further defines a first hollow cavity 224 that receives the first fluid from the first fluid port 214 (see FIG. 2) during the extension of the actuator 200. The tube 222 further defines a second hollow cavity 225 that receives the second fluid from the second fluid port 216 during the retraction of the actuator 200. Further, in some examples, the first fluid port 214 and the second fluid port 216 are defined in the tube 222.

The actuator 200 includes a first cylinder 226 concentrically received within the cylinder barrel 202. The first cylinder 226 defines a first cylinder end 228 that is disposed proximal to the cylinder end 204 of the actuator 200 when the actuator 200 is in the retracted position. The first cylinder 226 further defines a first piston end 230 that is disposed proximal to the piston end 210 of the actuator 200 when the actuator 200 is in the retracted position. The first cylinder end 228 and the first piston end 230 are disposed opposite to each other along the longitudinal axis A1.

The actuator 200 also includes a second cylinder 234 concentrically received within the first cylinder 226. The second cylinder 234 defines a second cylinder end 236 that is disposed proximal to the first cylinder end 228 when the actuator 200 is in the retracted position. The second cylinder 234 further defines a second piston end 238 that is disposed proximal to the piston end 210 of the actuator 200 when the actuator 200 is in the retracted position. The second cylinder end 236 and the second piston end 238 are disposed opposite to each other along the longitudinal axis A1.

The actuator 200 further includes a third cylinder 242 concentrically received within the second cylinder 234. The third cylinder 242 receives the piston arrangement 208 therein. The third cylinder 242 defines a third cylinder end 244 that is disposed proximal to the second cylinder end 236 when the actuator 200 is in the retracted position. The third cylinder 242 further defines a third piston end 246 that is disposed proximal to the piston end 210 of the actuator 200 when the actuator 200 is in the retracted position. The third cylinder end 244 and the third piston end 246 are disposed opposite to each other along the longitudinal axis A1. The actuator 200 is embodied as a four-stage actuator herein, such that the four-stages of the actuator 400 constitute the cylinder barrel 202, the first cylinder 226, the second cylinder 234, and the third cylinder 242.

The first cylinder 226, the second cylinder 234, and the third cylinder 242 are slidable relative to each other along the longitudinal axis A1 for moving the actuator 200 between the retracted position and the extended position. During the extension of the actuator 200, each of the first cylinder 226, the second cylinder 234, and the third cylinder 242 move in a first direction F1 along the longitudinal axis A1. Further, during the retraction of the actuator 200, each of the first cylinder 226, the second cylinder 234, and the third cylinder 242 move in a second direction S1 along the longitudinal axis A1. Although only three cylinders 226, 234, 242 are illustrated and explained herein, it may be contemplated that the actuator 200 may include more than three cylinders or less than three cylinders, based on application requirements.

Figure 4:
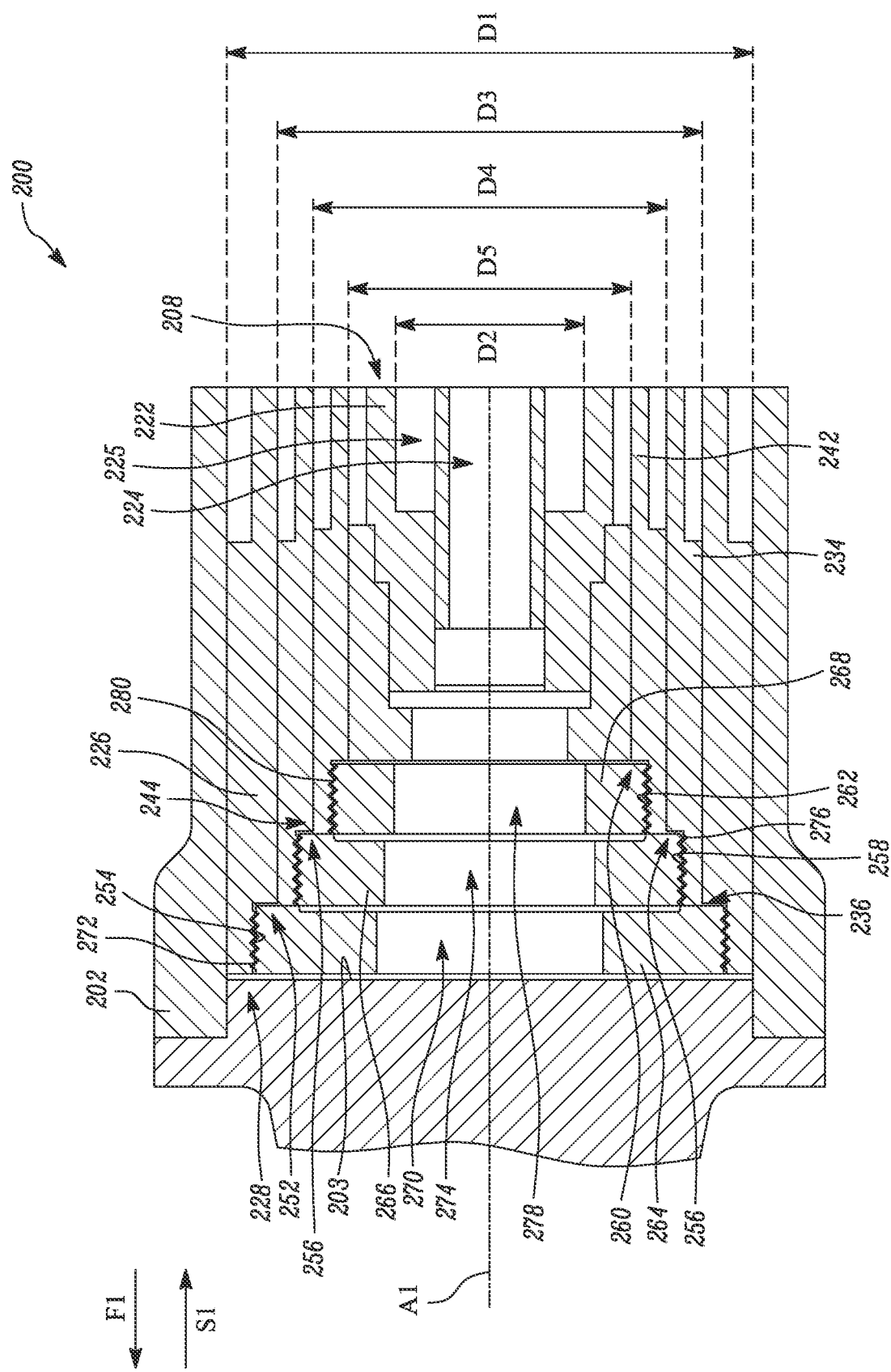
FIG. 4 is a cross-sectional view illustrating a portion of the actuator of FIG. 3.

Referring to FIG. 4, a cross-sectional view of a portion of the actuator 200 is illustrated. As shown in FIG. 4, the first cylinder 226 defines an annular groove 252 proximal to the first cylinder end 228. Further, the first cylinder 226 includes internal threads 254. In some examples, the internal threads 254 may be in communication (e.g., being defined proximate) with the annular groove 252. The first cylinder 226 defines an internal diameter D3. Further, the internal diameter D3 of the first cylinder 226 is less than the internal diameter D1 of the cylinder barrel 202.

The second cylinder 234 defines an annular groove 256 proximal to the second cylinder end 236. Further, the second cylinder 234 includes internal threads 258. In some examples, the internal threads 258 may be in communication (e.g., being defined proximate) with the annular groove 256. The second cylinder 234 defines an internal diameter D4. Further, the internal diameter D4 of the second cylinder 234 is less than the internal diameter D3 of the first cylinder 226.

The third cylinder 242 defines an annular groove 260 proximal to the third cylinder end 244. Further, the third cylinder 242 includes internal threads 262. In some examples, the internal threads 262 may be in communication (e.g., being defined proximate) with the annular groove 260.

The third cylinder 242 defines an internal diameter D5. Further, the internal diameter D5 of the third cylinder 242 is less than the internal diameter D3 of the first cylinder 226 and the internal diameter D4 of the second cylinder 234. Moreover, the internal diameter D5 of the third cylinder 242 is greater than the internal diameter D2 of the tube 222. It should be noted that the actuator 200 may include other features or components (not illustrated herein), such as, passages, apertures, plugs, sealing rings or sealing cups, as per application requirements.

Further, the actuator 200 includes a first member 264, a second member 266, and a third member 268. The first member 264, the second member 266, and the third member 268 are co-axially disposed along the longitudinal axis A1 of the actuator 200. Each of the first member 264, the second member 266, and the third member 268 are embodied as disc-shaped members. It should be noted that, one or more of the first member 264, the second member 266, and the third member 268 are threadedly coupled to the first cylinder 226, the second cylinder 234, and the third cylinder 242, respectively. In such examples, each of the first member 264, the second member 266, and the third member 268 may be embodied as a fastening nut.

Although the actuator 200 described herein includes three members 264, 266, 268, a total number of such members may vary based on a total number of stages associated with the actuator 200. For an n-stage actuator, a total number of members (similar to the members 264, 266, 268) may be n−1. For example, as the actuator 200 is embodied as the four-stage actuator herein, the actuator 200 includes three members 264, 266, 268. In other embodiments, wherein the actuator 200 may be embodied as a three-stage actuator, the actuator 200 may include two members (similar to the members 264, 266, 268).

As illustrated in FIG. 4, in the retracted position of the actuator 200, the first member 264 at least partially contacts the second member 266, and the second member 266 at least partially contacts the third member 268. Further, in the retracted position of the actuator 200, the first member 264 is in contact with the end face 203 of the cylinder barrel 202. In some examples, a material of each of the first member 264, the second member 266, and the third member 268 may be similar to a material of the first, second, and third cylinder 226, 234, 242. Further, a dimension (such as, a diameter) of the first member 264 is greater than a dimension (such as, a diameter) of each of the second and third members 266, 268. Moreover, the dimension of the second member 266 is greater than the dimension of the third member 268. Although only three members 264, 266, 268 are illustrated and explained herein, it may be contemplated that the actuator 200 may include more than three members or less than three members, based on a total number of cylinders associated with the actuator 200.

Further, the first member 264 is coupled to the first cylinder 226 at the first cylinder end 228. The first member 264 defines a first central opening 270. As illustrated in FIG. 4, the annular groove 252 receives the first member 264 therein. The first member 264 includes external threads 272, such that the external threads 272 of the first member 264 engage with the internal threads 254 of the first cylinder 226 for removably coupling the first member 264 with the first cylinder 226.

Furthermore, the second member 266 is coupled to the second cylinder 234 at the second cylinder end 236. The second member 266 defines a second central opening 274, such that the second central opening 274 is in alignment with the first central opening 270. As illustrated in FIG. 4, the annular groove 256 receives the second member 266 therein. Further, the second member 266 includes external threads 276, such that the external threads 276 of the second member 266 engage with the internal threads 258 of the second cylinder 234 for removably coupling the second member 266 with the second cylinder 234.

Moreover, the third member 268 is coupled to the third cylinder 242 at the third cylinder end 244. The third member 268 defines a third central opening 278, such that the third central opening 278 is in alignment with the first and second central openings 270, 274. The first, second, and third central openings 270, 274, 278 may allow passage of the first fluid therethrough so that the first fluid may be received within the first, second, and third cylinders 226, 234, 242 for extension of the actuator 200. As illustrated in FIG. 4, the annular groove 260 receives the third member 268. Further, the third member 268 includes external threads 280, such that the external threads 280 of the third member 268 engage with the internal threads 262 of the third cylinder 242 for removably coupling the third member 268 with the third cylinder 242.

Figure 5:
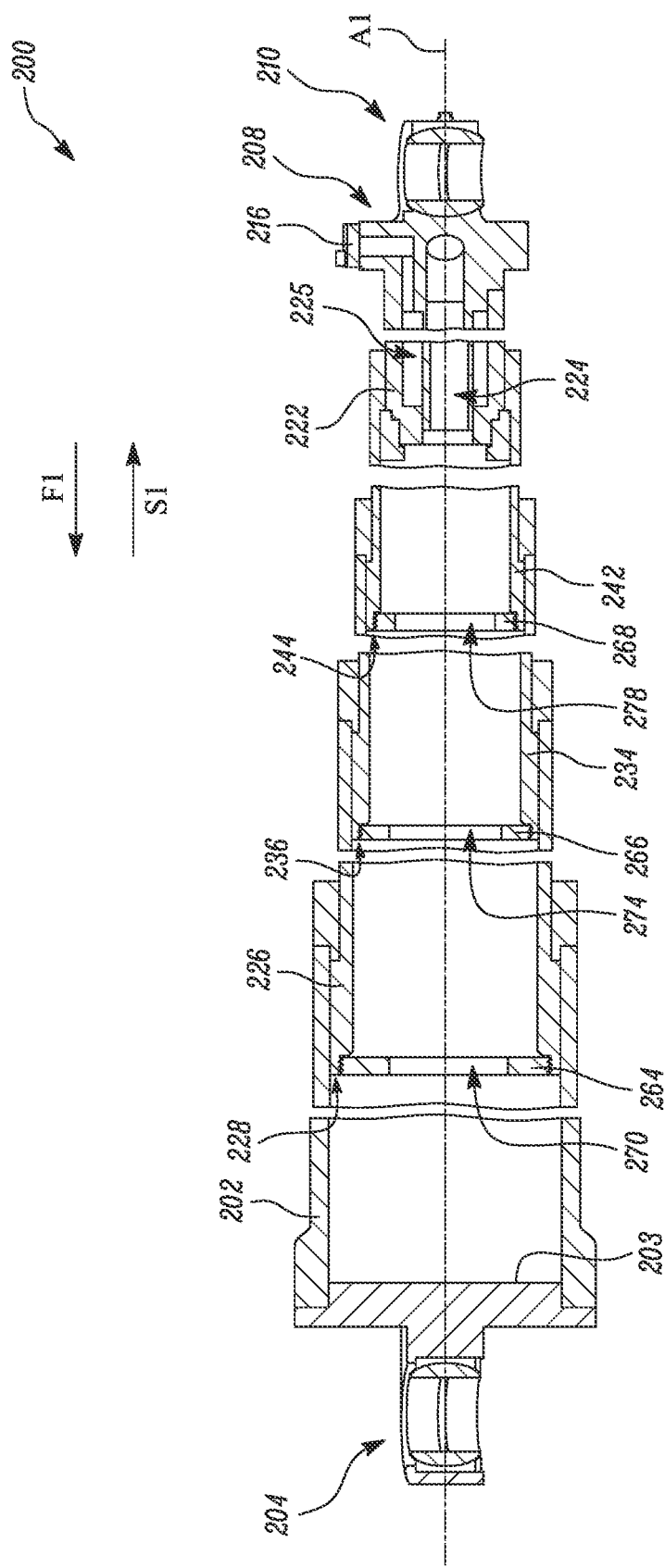
FIG. 5 is a break-away cross-sectional view of the actuator of FIGS. 2 to 4, in an extended position.

FIG. 5 illustrates a break-away view of the actuator 200 in the extended position. When the actuator 200 is to be moved to the extended position, the first fluid is pumped into the actuator 200 via the first fluid port 214 (see FIG. 2) and the first fluid line (see FIG. 2). The first fluid may cause each of the cylinder barrel 202, the first cylinder 226, the second cylinder 234, and the third cylinder 242 to extend in a sequential manner for moving the actuator 200 to the extended position. As illustrated in FIG. 5, when the actuator 200 is in the extended position, the first member 264 is spaced apart from the second member 266, and the second member 266 is spaced apart from the third member 268. Further, the first member 264 is also spaced apart from the end face 203 of the cylinder barrel 202.

Furthermore, for moving the actuator 200 to the retracted position, the second fluid is pumped into the actuator 200 via the second fluid port 216 and the second fluid line (see FIG. 2). The second fluid may cause each of the third cylinder 242, the second cylinder 234, the first cylinder 226, and the cylinder barrel 202 to retract in a sequential manner for moving the actuator 200 to the retracted position. When the actuator 200 is retracting, the third member 268 may contact the tube 222 to limit any further movement of the third cylinder 242 in the second direction S1. Similarly, when the second cylinder 234 is retracting, the second member 266 may contact the third member 268 to limit any further movement of the second cylinder 234 in the second direction S1. Further, when the first cylinder 226 is retracting, the first member 264 may contact the second member 266 to limit any further movement of the first cylinder 226 in the second direction S1.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure relates to the actuator 200. The actuator 200 is embodied as a multistage actuator that may be used in conjunction with the material ejection system 134 associated with various dump-type machines. Further, the actuator 200 described herein may be used in other applications that require a longer output stroke length.

The actuator 200 described herein includes the first member 264, the second member 266, and the third member 268 that are threadedly coupled to the first cylinder 226, the second cylinder 234, and the third cylinder 242, respectively. The first member 264, the second member 266, and the third member 268 may be embodied as a stopping mechanism during the retraction of the actuator 200. For example, the first member 264, the second member 266, and the third member 268 may act as an integrated stop that may limit or restrict a travel of each of the first, second, and third cylinders 226, 234, 242, respectively.

Further, the first member 264, the second member 266, and the third member 268 may be easy to assemble with the respective first, second, and third cylinders 226, 234, 242 in a factory set-up or during a replacement/servicing of the actuator 200 at a worksite. The first member 264, the second member 266, and the third member 268 may be assembled, removed, and/or replaced without requiring special tools or set-ups. Further, a design of the first member 264, the second member 266, and the third member 268 may be less susceptible to failures in comparison to conventional retention mechanisms. Overall, the first member 264, the second member 266, and the third member 268 may improve serviceability, assembly, and reliability of the actuator 200 in a cost-effective manner.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. An actuator for a machine, the actuator comprising:
   a cylinder barrel defining a cylinder end of the actuator;
   a piston arrangement concentrically received within the cylinder barrel, the piston arrangement defining a piston end of the actuator;
   a first cylinder concentrically received within the cylinder barrel, wherein the first cylinder defines a first cylinder end that is disposed proximate to the cylinder end of the actuator when the actuator is in a retracted position, wherein the first cylinder further defines a first piston end that is disposed proximate to the piston end of the actuator when the actuator is in the retracted position, and wherein the first cylinder end includes a first annular groove and first internal threads in communication with the first annular groove, the first annular groove including a radial surface extending radially inward from the first internal threads to an inner surface of the first cylinder;
   a first member threadably coupled to the first internal threads without any retainer rings or welded piston stops therebetween, the first member abutting the radial surface of the first annular groove;
   a second cylinder concentrically received within the first cylinder, wherein the second cylinder defines a second cylinder end that is disposed proximate to the first cylinder end when the actuator is in the retracted position, and wherein the second cylinder further defines a second piston end that is disposed proximate to the piston end of the actuator when the actuator is in the retracted position;
   a second member coupled to the second cylinder at the second cylinder end;
   a third cylinder concentrically received within the second cylinder, wherein the third cylinder receives the piston arrangement therein, wherein the third cylinder defines a third cylinder end that is disposed proximate to the second cylinder end when the actuator is in the retracted position, and wherein the third cylinder further defines a third piston end that is disposed proximate to the piston end of the actuator when the actuator is in the retracted position; and
   a third member coupled to the third cylinder at the third cylinder end, wherein at least one of the first member, the second member, and the third member is threadedly coupled to the first cylinder, the second cylinder, and the third cylinder, respectively,
   wherein the first member, the second member, and the third member act as an integrated stop that limits or restricts a travel of each of the first cylinder, second cylinder, and third cylinder, respectively.

2. The actuator of claim 1, wherein the first member, the second member, and the third member are co-axially disposed along a longitudinal axis of the actuator.

3. The actuator of claim 2, wherein the first cylinder, the second cylinder, and the third cylinder are slidable relative to each other along the longitudinal axis for moving the actuator between the retracted position and an extended position.

4. The actuator of claim 1, wherein, in the retracted position of the actuator, the first member at least partially contacts the second member, and the second member at least partially contacts the third member.

5. The actuator of claim 1, wherein the first cylinder includes internal threads, and wherein the first member includes external threads, such that the external threads of the first member engage with the internal threads of the first cylinder for removably coupling the first member with the first cylinder.

6. The actuator of claim 1, wherein the second cylinder includes internal threads, and wherein the second member includes external threads, such that the external threads of the second member engage with the internal threads of the second cylinder for removably coupling the second member with the second cylinder.

7. The actuator of claim 1, wherein the third cylinder includes internal threads, and wherein the third member includes external threads, such that the external threads of the third member engage with the internal threads of the third cylinder for removably coupling the third member with the third cylinder.

8. A material handling system for a machine, the material handling system comprising:
   a receptacle having a material ejection system; and
   an actuator operatively coupled to the receptacle and the material ejection system, wherein the actuator includes:
      a cylinder barrel defining a cylinder end of the actuator, the actuator being coupled to the material ejection system at the cylinder end thereof;
      a piston arrangement concentrically received within the cylinder barrel, the piston arrangement defining a piston end of the actuator, the actuator being coupled to the receptacle at the piston end thereof;
      a first cylinder concentrically received within the cylinder barrel, wherein the first cylinder defines a first cylinder end that is disposed proximate to the cylinder end of the actuator when the actuator is in a retracted position, wherein the first cylinder further defines a first piston end that is disposed proximate to the piston end of the actuator when the actuator is in the retracted position, and wherein the first cylinder end includes a first annular groove and first internal threads in communication with the first annular groove, the first annular groove including a radial surface extending radially inward from the first internal threads to an inner surface of the first cylinder;

a first member threadably coupled to the first internal threads without any retainer rings or welded piston stops therebetween, the first member abutting the radial surface of the first annular groove;

a second cylinder concentrically received within the first cylinder, wherein the second cylinder defines a second cylinder end that is disposed proximate to the first cylinder end when the actuator is in the retracted position, and wherein the second cylinder further defines a second piston end that is disposed proximate to the piston end of the actuator when the actuator is in the retracted position;

a second member coupled to the second cylinder at the second cylinder end;

a third cylinder concentrically received within the second cylinder, wherein the third cylinder receives the piston arrangement therein, wherein the third cylinder defines a third cylinder end that is disposed proximate to the second cylinder end when the actuator is in the retracted position, and wherein the third cylinder further defines a third piston end that is disposed proximate to the piston end of the actuator when the actuator is in the retracted position; and a third member coupled to the third cylinder at the third cylinder end, wherein at least one of the first member, the second member, and the third member is threadedly coupled to the first cylinder, the second cylinder, and the third cylinder, respectively, wherein the first member, the second member, and the third member act as an integrated stop that limits or restricts a travel of each of the first cylinder, second cylinder, and third cylinder, respectively.

9. The material handling system of claim 8, wherein the first member, the second member, and the third member are co-axially disposed along a longitudinal axis of the actuator.

10. The material handling system of claim 9, wherein the first cylinder, the second cylinder, and the third cylinder are slidable relative to each other along the longitudinal axis for moving the actuator between the retracted position and an extended position.

11. The material handling system of claim 8, wherein, in the retracted position of the actuator, the first member at least partially contacts the second member, and the second member at least partially contacts the third member.

12. The material handling system of claim 8, wherein the first cylinder includes internal threads, and wherein the first member includes external threads, such that the external threads of the first member engage with the internal threads of the first cylinder for removably coupling the first member with the first cylinder.

13. The material handling system of claim 8, wherein the second cylinder includes internal threads, and wherein the second member includes external threads, such that the external threads of the second member engage with the internal threads of the second cylinder for removably coupling the second member with the second cylinder.

14. The material handling system of claim 8, wherein the third cylinder includes internal threads, and wherein the third member includes external threads, such that the external threads of the third member engage with the internal threads of the third cylinder for removably coupling the third member with the third cylinder.

15. A machine comprising:
a frame; and
a material handling system supported by the frame, the material handling system including:
a receptacle having a material ejection system; and
an actuator operatively coupled to the receptacle and the material ejection system, wherein the actuator includes:
a cylinder barrel defining a cylinder end of the actuator, the actuator being coupled to the material ejection system at the cylinder end thereof;
a piston arrangement concentrically received within the cylinder barrel, the piston arrangement defining a piston end of the actuator, the actuator being coupled to the receptacle at the piston end thereof;
a first cylinder concentrically received within the cylinder barrel, wherein the first cylinder defines a first cylinder end that is disposed proximate to the cylinder end of the actuator when the actuator is in a retracted position, wherein the first cylinder further defines a first piston end that is disposed proximate to the piston end of the actuator when the actuator is in the retracted position, and wherein the first cylinder end includes a first annular groove and first internal threads in communication with the first annular groove, the first annular groove including a radial surface extending radially inward from the first internal threads to an inner surface of the first cylinder;
a first member threadably coupled to the first internal threads without any retainer rings or welded piston stops therebetween, the first member abutting the radial surface of the first annular groove;
a second cylinder concentrically received within the first cylinder, wherein the second cylinder defines a second cylinder end that is disposed proximate to the first cylinder end when the actuator is in the retracted position, and wherein the second cylinder further defines a second piston end that is disposed proximate to the piston end of the actuator when the actuator is in the retracted position;
a second member coupled to the second cylinder at the second cylinder end;
a third cylinder concentrically received within the second cylinder, wherein the third cylinder receives the piston arrangement therein, wherein the third cylinder defines a third cylinder end that is disposed proximate to the second cylinder end when the actuator is in the retracted position, and wherein the third cylinder further defines a third piston end that is disposed proximate to the piston end of the actuator when the actuator is in the retracted position; and
a third member coupled to the third cylinder at the third cylinder end, wherein at least one of the first member, the second member, and the third member is threadedly coupled to the first cylinder, the second cylinder, and the third cylinder, respectively, wherein the first member, the second member, and the third member act as an integrated stop that limits or restricts a travel of each of the first cylinder, second cylinder, and third cylinder, respectively.

16. The machine of claim 15, wherein the first member, the second member, and the third member are co-axially disposed along a longitudinal axis of the actuator.

17. The machine of claim 15, wherein, in the retracted position of the actuator, the first member at least partially contacts the second member, and the second member at least partially contacts the third member.

18. The machine of claim 15, wherein the first cylinder includes internal threads, and wherein the first member includes external threads, such that the external threads of the first member engage with the internal threads of the first cylinder for removably coupling the first member with the first cylinder.

19. The machine of claim 15, wherein the second cylinder includes internal threads, and wherein the second member includes external threads, such that the external threads of the second member engage with the internal threads of the second cylinder for removably coupling the second member with the second cylinder.

20. The machine of claim 15, wherein the third cylinder includes internal threads, and wherein the third member includes external threads, such that the external threads of the third member engage with the internal threads of the third cylinder for removably coupling the third member with the third cylinder.

* * * * *